United States Patent [19]
Mulford

[11] Patent Number: 5,301,232
[45] Date of Patent: Apr. 5, 1994

[54] METHOD AND APPARATUS FOR OVER-THE-AIR PROGRAMMING OF COMMUNICATION DEVICES

[75] Inventor: Keith I. Mulford, Arlington Heights, Ill.

[73] Assignee: Motorola, Inc., Schaumburg, Ill.

[21] Appl. No.: 971,737

[22] Filed: Nov. 5, 1992

[51] Int. Cl.⁵ .............................................. H04L 9/00
[52] U.S. Cl. ......................................... 380/21; 380/42
[58] Field of Search ................................... 380/21, 42

[56] References Cited

U.S. PATENT DOCUMENTS

| | | | |
|---|---|---|---|
| 5,150,408 | 9/1992 | Bright | 380/21 |
| 5,161,189 | 11/1992 | Bray et al. | 380/21 |
| 5,164,986 | 11/1992 | Bright | 380/21 |
| 5,185,795 | 2/1993 | Bright | 380/21 |
| 5,185,797 | 2/1993 | Barrett et al. | 380/21 |

OTHER PUBLICATIONS

Motorola Information sheet "Advanced SECURE-NET ®" -Digital Voice Protection System Key Management Controller, (No R3-17-62-1989), 2 pages discloses a control device (KMC) for use in Over-the-Air Rekeying Systems.
Motorola Information Brochure "Advanced SECURE-NET ® Systems"-Multikey Operation, Over-the-Air Rekeying (OTAR), (No. R3-17-61-1989), 4 pages, discusses multikey and OTAR System Operation.
Motorola Brochure "System Planner-Advanced SECURENET ® for Conventional Systems" (No. R4-17-A, Jan. 1992), 24 pages, discloses the operation of present Advanced SECURENET ® Systems.
Motorola System Installation and User's Guide for "Advanced SECURENET ®-Key Management Controller (KMC)", (No. 68P81084E85-B, Apr. 10, 1992), discloses overall operation of an Advanced SECURENET ® System.

Primary Examiner—David C. Cain
Attorney, Agent, or Firm—Pedro P. Hernandez

[57] ABSTRACT

In a communication system (300), a controller interface (302) provides for monitoring of channel activity in order to determine communication devices (400) which are communicating using old encryption information. Upon a key management controller (306) determining that one or more communication devices are using an old encryption scheme, the key management controller (306) establishes communications with the communication device(s) (400) and provides them with the new encryption information.

8 Claims, 4 Drawing Sheets

METHOD AND APPARATUS FOR OVER-THE-AIR PROGRAMMING OF COMMUNICATION DEVICES

TECHNICAL FIELD

This invention relates to communication systems, and more specifically to a method and apparatus for over-the-air programming of electronic devices.

BACKGROUND

During the process of providing communication devices such as radios with new encryption information using radio frequency (RF) transmissions ("over-the-air"), messages are sent to individual radios or groups of radios with the new programming information. A typical reprogramming sequence known as "rekeying" provides a radio with new encryption key(s) which the radio can begin to use in order to encrypt/decrypt future communication messages. With a communication key management controller providing new encryption information periodically, the security of communications between communication devices in the system is increased, since it would be futile for an eavesdropper to attempt to decode the encrypted transmissions given the fact that periodically the encryption scheme is changed.

During the process of reprogramming the radios during an encryption rekey sequence, if a radio is turned off, is out of range of the communication system, or is in a condition where the programming information can not reach the radio, that radio(s) would be unable to communicate with the rest of the communication system when the new encryption information goes into effect. Given the complexity of reprogramming radios over-the-air, there is a very good possibility that some number of communication units in the system will lose communications with the system due to some failure in the rekeying process as mentioned before.

Current over-the-air-rekeying (OTAR) systems attempt to compensate for this problem by sending the encryption information on a periodic basis to field units which have not acknowledged the initial rekey command. These re-try attempts are typically sent only a limited number of times and the duration of time between successive retries is usually increased, so that these retries do not increase the loading on the system. Unfortunately, this retry process does not assure that a field unit will be rekeyed promptly when it returns to an active service state (e.g., when it attempts to communicate with another unit). Furthermore, after the key management controller stops the retry process and no more retry attempts are sent, a field unit may have no chance of regaining entry into future encrypted communications.

In present communication system designs, the solution to the previously mentioned rekeying short comings is to increase the number and the frequency of the retries by the key management controller. This however has a negative impact on system capacity and interferes with future rekeying processes (e.g., if some radios have yet to be rekeyed from the previous rekey operation and new rekey sequence is now being sent out). Thus a need exists for a method and apparatus for providing new programming information such as encryption information to communication devices in a more efficient and timely manner.

DETAILED DESCRIPTION OF THE PREFERRED EMBODIMENT

Figure 3:
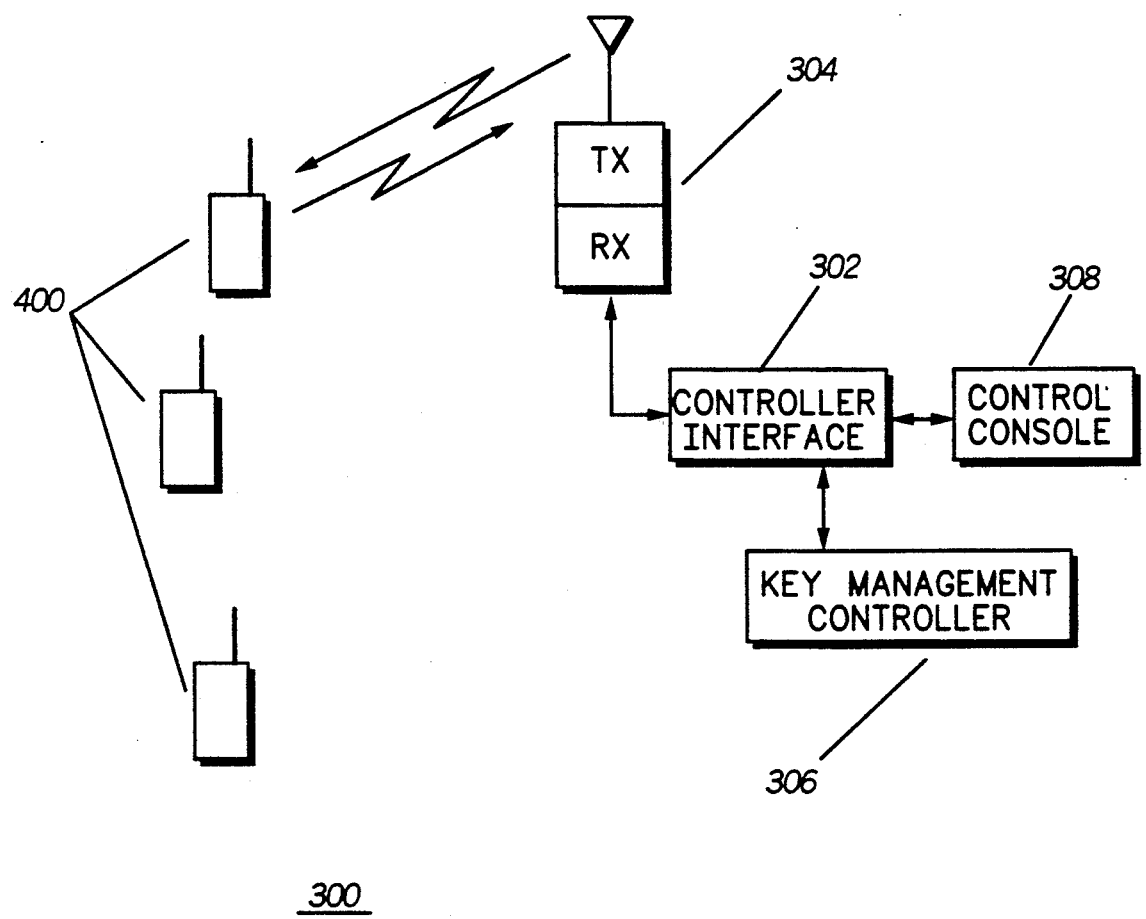
FIG. 3 is a block diagram of a communication system in accordance with the present invention.

Referring now to the drawings and specifically to FIG. 3, there is shown a block diagram of a communication system 300 in accordance with the present invention. Radio communication system 300 comprises a plurality of communication devices 400 such as two-way portable radios, mobile radios, fixed stations, etc. A controller interface 302 (such as a Digital Interface Unit manufactured by Motorola, Inc.) is included as part of the system and provides encryption functions and interface to a communication channel resource, such as Base Station/Repeater 304. The controller interface 302 also provides access between the communication channel resource 304 and the Key Management Controller (KMC) 306 and/or a manned Control Console 307 which may be utilized to coordinate the system's communication activity.

Control Console 307 includes a speaker and other audio switching hardware for monitoring the received messages from repeater 304 and a transmission means which includes a microphone and audio routing circuitry for transmitting messages to the communication devices 400 via the transmitter located in repeater 304.

The controller interface 302 provides the encryption function for both voice and other types of information messages during both transmit and receive operations. Although FIG. 3 is shown as a non-trunked system, the present invention can also be used in trunked systems, as well as cellular and other types of communication systems. Repeater 304 which is connected to the controller interface comprises a transmitter and receiver section for use in communicating with communication devices 400.

Coupled to controller interface 302 is an encryption key management controller 306 such as a Key Management Controller (KMC) manufactured by Motorola, Inc. KMC 306 is a computerized system which includes a database means such as a computerized database of all system users, as well as encryption key information for all communication devices. KMC 306 also includes control software for determining which units have been rekeyed and which have not. KMC 306 decides when to poll each of the communication devices 400 in order to reprogram their encryption information after the system administrator decides to change the communication device's encryption keys. KMC 306 can be programmed to automatically update the communication device's encryption keys.

KMC 306 establishes communication with the communication units via repeater 304 which allows the KMC bi-directional communication capability with the communication devices 400. Although shown as separate units, controller interface 302 and KMC 306 could be combined to form an integrated system controller. Furthermore, the KMC 306 and controller interface 302 may be utilized without the presence of a manned audio control console 308 in systems where audio is not required at the KMC location.

Figure 1:
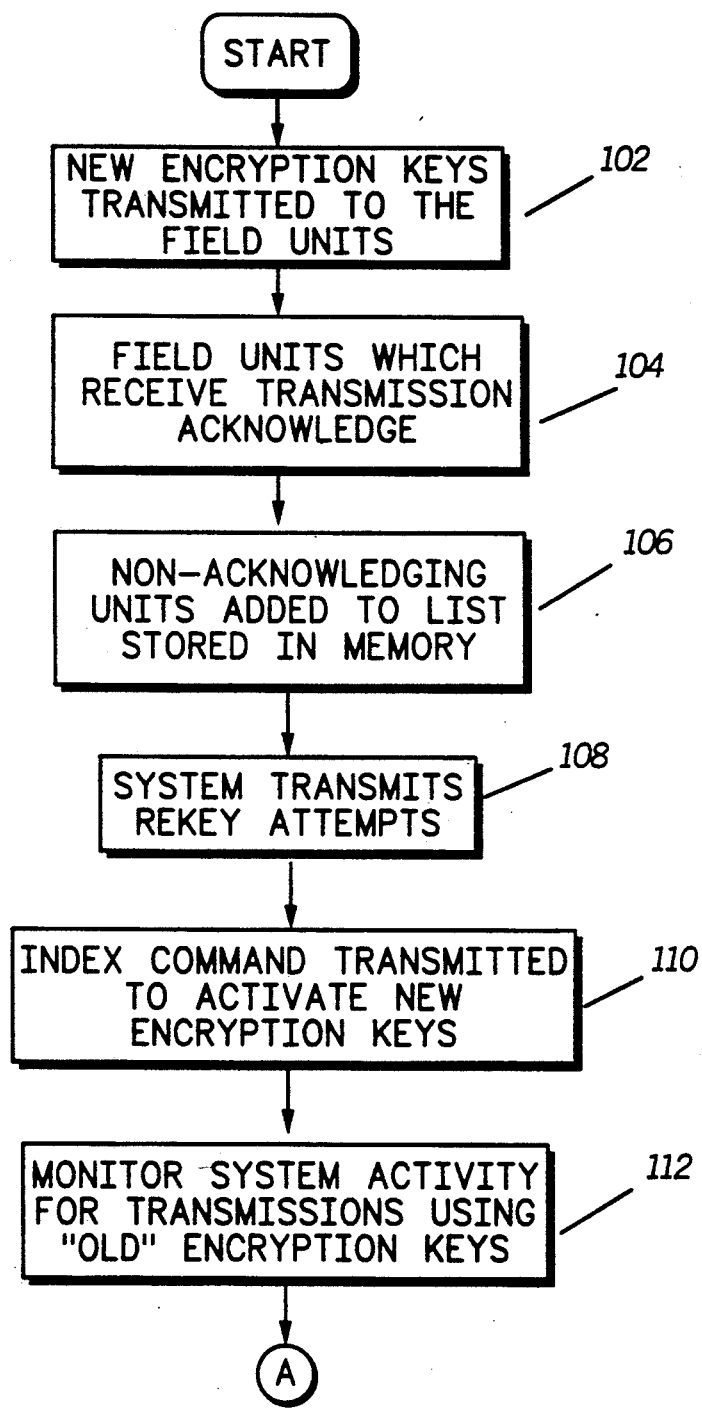
FIG. 1 is a flowchart showing a typical reprogramming sequence in accordance with the present invention.
Figure 2:
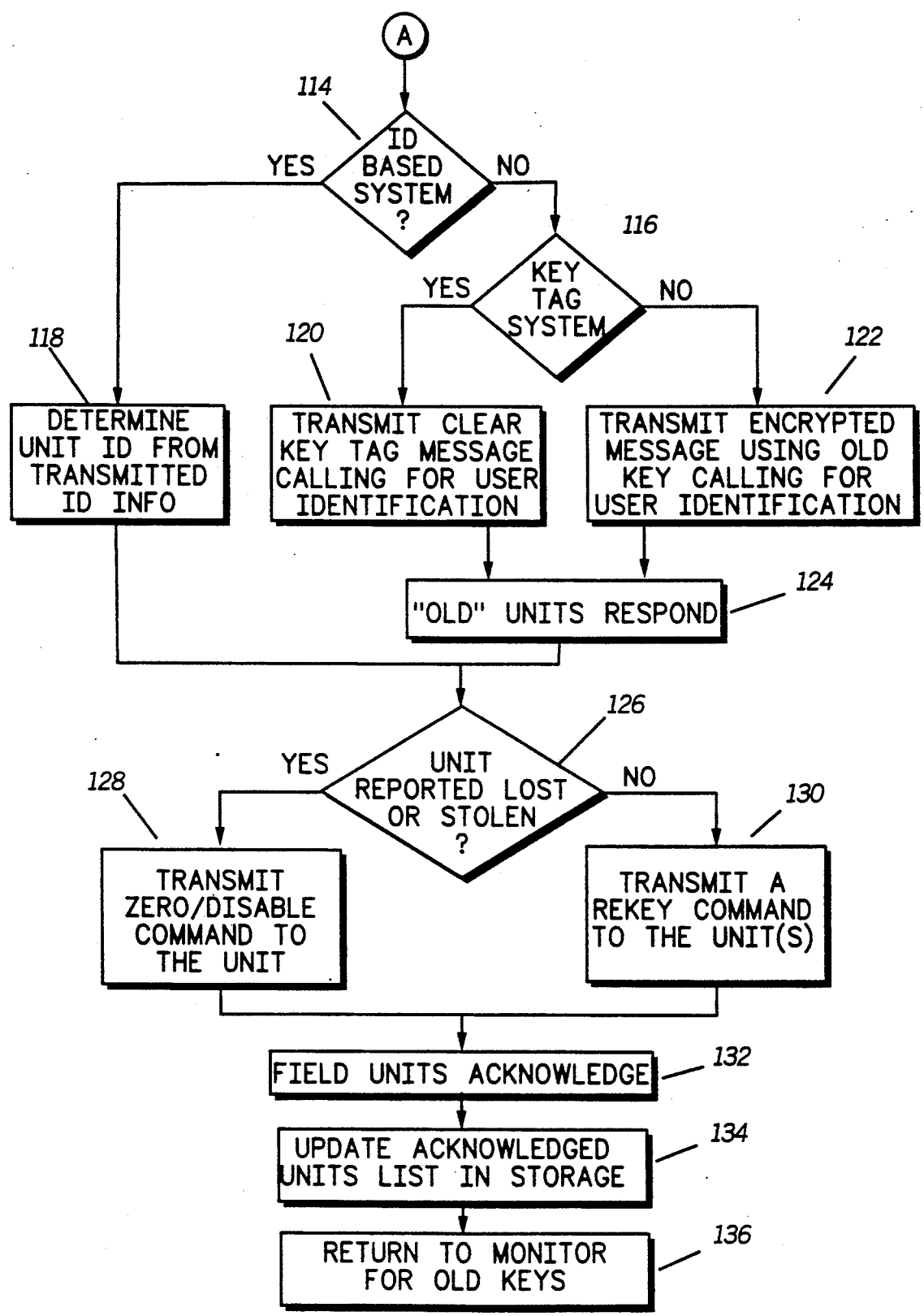
FIG. 2 is a continuation of the flowchart of FIG. 1.

In FIG. 1, a flowchart of a typical reprogramming sequence in accordance with the invention is shown. In step 102, information in the form of new encryption keys are transmitted to the field units 400 by KMC 306, in conjunction with controller interface 302 via repeater 304. In step 104, the communication units which receive the information acknowledge the controller interface 302 by each sending an acknowledgment message. In step 106, the acknowledgment message(s) is recorded by KMC 306 in its database in order to have a record of which units have successfully received the new programming information.

In step 108, KMC 306 begins to periodically generate encryption rekey messages which are transmitted via repeater 304 in order to provide the new encryption information to the communication units which according to the KMC's database have yet to received the new encryption keys. These are the communication units 400 which are not showing up in the KMC's database as having have sent an acknowledgment message informing the KMC that the previously sent encryption information had been received by them.

With the active monitoring of channel activity utilized by the present invention, which will be discussed below, the number of rekey messages transmitted (such as in step 108) are kept to a minimum since the present invention is able to quickly rekey individual units which either register with the system or begin transmitting on one of the system's communication channels 304.

In step 110, the KMC generates an "Index Command" which is a message informing the communication units which have received the new encryption keys to activate the new keys and to destroy the old encryption keys. In order to provide increased flexibility in the reprogramming process, the index command could also be performed manually at each of the communication units 400. The communication units 400 can be alerted as to when new programming information has been received by either audio or visual annunciation at the communication device. The Index Command is sent via repeater 304 to all radios in service and within range of the system.

In step 112, the KMC 306/controller interface 302 monitors for system activity on the receive channel of repeater 304 in order to determine if any transmissions have occurred using "old" encryption keys by any of the communication devices 400. In the case that communication system 300 includes more than one communication channel (e.g., more than one repeater 304), KMC 306 can monitor one or more channel resources which are showing communication activity by using multiple controller interfaces 302. The controller interface 302 and KMC 306 must switch between the "old" and "new" encryption keys quickly in order not to miss any communication activity which is occurring. This can be accomplished by the KMC 306 loading separate encryption circuits found in controller interface 302; one with the "old" key and one circuit with the "new" key. The controller interface(s) 302 would then monitor the communication channel(s) utilizing the parallel encryption circuits during the reception of a message in order to determine if the encrypted message is using either of the encryption keys.

In Key Tag based systems an alternate implementation can be utilized. A Key Tag based system is one in which a clear text message identifying the "name" or identity of the encryption key in use is transmitted along with an encrypted message. A key tag can be a number (pointer variable) which informs the communication unit 400 what encryption key is being used. In some systems, the communication units can have the capability of storing a plurality of encryption keys ("multi-key" capable radio) and the transmission of a key-tag will inform the communication unit 400 which of the encryption keys to use. In such a system, the parallel encryption circuits found in the controller interface 302 can be replaced with a single circuit which has the capability to monitor the identity of the keys being used in the received messages and which is also programmed to look for "old" key tags indicating traffic from radios which have not received the most recent rekey information.

In step 114, the KMC 306 in combination with the controller interface 302, after determining that at least one of the communication devices is using an "old" encryption key, determines if the communication system 300 is an ID based system. An ID based system is a communication system in which the identification number of the communication devices 400 is transmitted with each message. If the system is an ID based system, in step 114, the KMC will determine during the monitoring of the communication unit's transmission the identification number of the communication device.

If in step 114, it is determined that the communication system is not an ID based system, KMC 306 will determine if the system utilizes key tags in step 116. If key tags are in use, the KMC 306 will generate a clear (non-encrypted) transmission with the old-key tag in step 120 requesting for the communication unit(s) 400 to identify itself. If key tags are not being used, the KMC 306 will generate an encrypted message using the old encryption key in step 122 requesting for the communication unit(s) 400 to identify itself.

In step 124, field unit(s) 400 utilizing the out of date encryption key (or recognizing the old key tag) will transmit an acknowledgment message to KMC 306 and provide their ID number(s). All other units 400 on the system which are utilizing the correct key will not understand or will ignore the command and will not acknowledge the KMC 306.

In step 126, KMC 306 and controller interface 302 determine if the unit(s) utilizing out of date key information as determined in steps 118, 120 or 122 have been previously reported lost or stolen. If the unit had been previously reported lost or stolen (compromised) as determined in step 126, in step 128 the KMC 306 transmits a zero/disable command message to the specified unit (s). This transmission can take the form of an information message which when received by the communication device 400 forces it to go into a non-operational state ("sleep-mode") and/or causes to destroy or zero any encryption key information in the particular radio's memory locations. This disable message can be transmitted using a digital signaling format such as MDC-1200 ™, ASTRO ™ 9.6 kbps signaling scheme, or Smartnet ™ Trunking signaling scheme all used by Motorola, Inc., or any other type of signaling format.

In step 130, if the unit is not reported lost or stolen, the KMC 306 transmits via communication resource 304 an encryption rekey command message to the particular unit(s). The rekey command message will provide the new encryption information to the communication device(s) 400. The KMC 306 will know that the units have successfully received the rekey transmission or have been disabled by receiving an acknowledgment message back from the units in step 132.

At this point, in step 136, the KMC 306 will update its database as to all units which still have not received new encryption keys and will continue to try to rekey these units by actively monitoring the communication activity in system 300 by returning to step 110.

Figure 4:
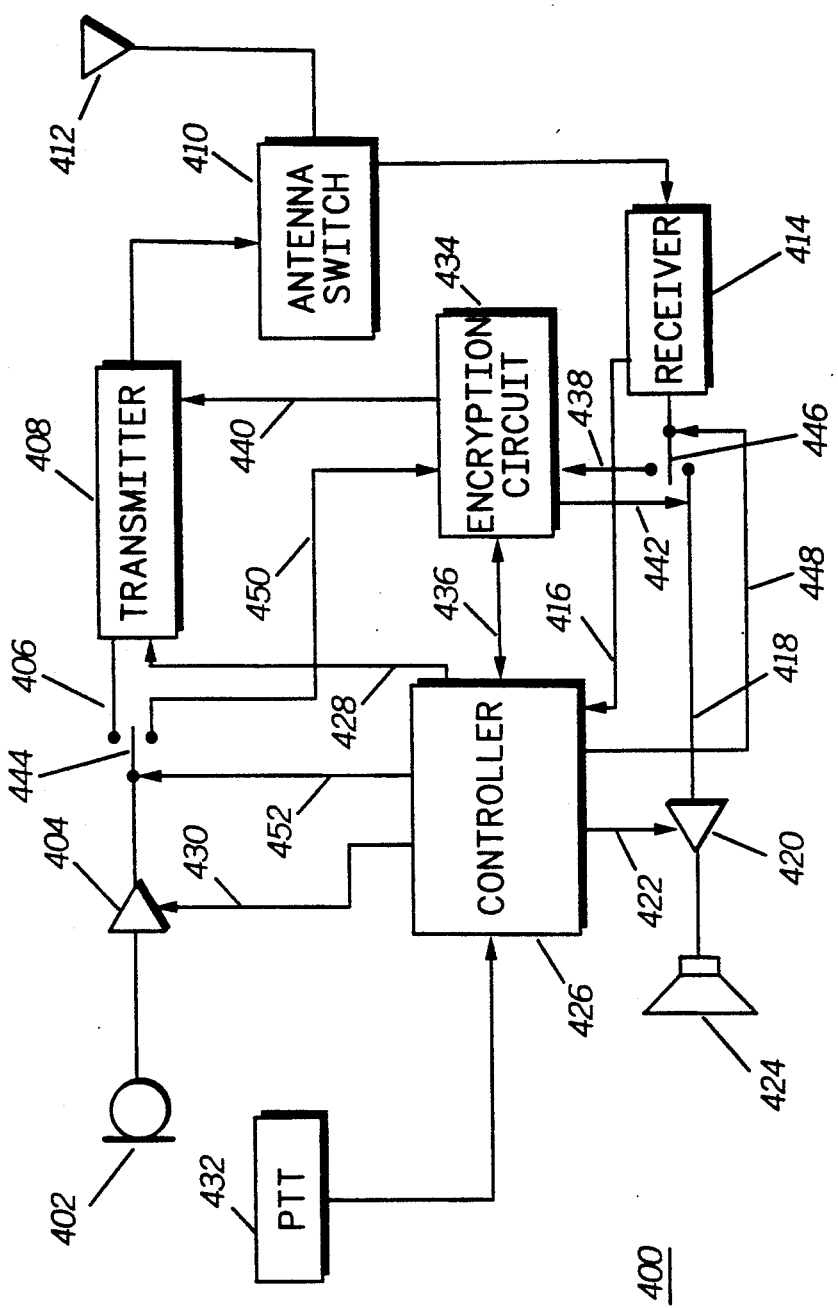
FIG. 4 is a block diagram of a communication device in accordance with the present invention.

Referring now to FIG. 4, there is shown a communication device such as a radio 400. Radio 400 comprises a control means such as a microprocessor 426 which is in control of the overall radio operations. A microphone 402 is used to receive voice message which are amplified by amplifier 404 prior to being presented directly to transmitter 408 via line 406 or indirectly to the transmitter through the encryption circuit 434. If the message is to be encrypted, the message is routed via switch 444 to encryption circuit 434 via lines 450 and 440. The gain of amplifier 404 is preferably under the control of controller 426 via line 430. Switch 444 is also under the microprocessor 426 control via line 450. Transmitter 408 is a conventional radio frequency transmitter which receives the amplified signal from amplifier 404 via line 406 or encryption circuit via line 440. A push-to-talk switch (PTT) 432 informs controller 426 when to activate transmitter 408 via line 428. An antenna switch 410 selectively couples antenna 412 to either transmitter 408 or receiver 414.

Receiver 414 receives the RF signals which are present at antenna 414 and converts them into either audio messages or data. The audio messages are sent through switch 446 and line 418 to amplifier 420 and the amplified messages are then sent to speaker 424. In the case of encrypted audio messages being received, switch 446 routes the encrypted information first through the encryption circuit 434 via lines 438 for decrypting and then via line 442 to amplifier 420. The amplifier 420 is under the control of controller 426 via line 422. Switch 446 is under the control of microprocessor 426 via line 448. If the information is in the form of unencrypted data, the information is sent via line 416 to controller 426 for further manipulation of the information. If the information is encrypted data it is sent to encryption circuit 434 for decryption prior to being sent to controller 426 (this routing is not shown).

Encryption circuit 434 is preferably capable of storing several encryption keys and/or encryption algorithms such as known in the art (e.g., multikey DES, etc). The encryption circuit 434 is under the control of controller 426 via line 436.

The present invention provides for a way of quickly recognizing that a communication device operating in a communication system is not using the most recent programming information such as encryption information and efficiently modifying the device's encryption information. The invention also increases the efficiency of the communication system by minimizing useless retry attempts by the system controller trying to reach the radios that have not received the information. The invention also allows the controller to quickly disable communication units which have been reported stolen or which create a compromise in system security.

In encrypted automatic registration systems (systems in which the communication units send an encrypted transmission containing their ID as soon as they come into service or are back within range of the communication system), the present invention provides for immediate rekeying of "missed" units upon receipt of the registration message since the KMC can automatically determine that the message has been transmitted using the old encryption information and which unit transmitted the message. Without the present invention, a communication unit operating in an automatic registration system would not be functional if it had missed a previous encryption rekeying sequence since the registration message sent by the communication unit could have been transmitted in the encrypted mode using the wrong (old) encryption information.

With prior communication systems, only after the system controller (KMC 306/controller interface 302) executed a successful retry would the communication device 400 be able to successfully register with the communication controller. Since as time passed in these systems, the retries by the system controller would typically get further apart (due to the attempt to reduce system overhead), it would cause the units which had not received the new encryption information to spend even greater time without being able to communicate with other units. The present invention since it actively monitors for both the "old" and "new" encryption information, the system can register the communication device even before the new encryption information is sent to the device via the retry sequence. A communication device 400 which transmits using old programming information such as an old encryption key, will be quickly modified by the system controller. Since the controller will establish communications with the unit and provide the new information.

Although the preferred embodiment has been shown as a system which provides new encryption information (e.g., new encryption keys, key tags, encryption algorithms, etc.) to radios 400 operating in system 300, the present invention is also applicable to other remote programming systems where the use of outdated programming information besides encryption (e.g., squelch codes such as PL, communication device operating data, etc.) can be ascertained by the KMC by actively monitoring channel activity. With the present invention's active monitoring of communication traffic, reprogramming of communication device information can be done quicker and produce less congestion on the system than the passive retry attempts presently being used by communication systems.

What is claimed is:

1. A method for programming a communication device having a first set of encryption information with a second set of encryption information using radio frequency signals, the communication device operating in a communication system having at least one communication channel and a system controller, comprising the steps of:

transmitting the second set of encryption information to the communication device;
    monitoring the at least one communication channel with the system controller in order to determine if the communication device is still using the first set of encryption information; and
    establishing communications between the system controller and the communication device in order to provide the second set of encryption information to the communication device if the communication device is still using the first set of encryption information.

2. A method as defined in claim 1, comprising the further step of:

transmitting an activation message to the communication device in order to activate the second set of encryption information.

3. A method as defined in claim 1, wherein the step of establishing communications between the system controller and the communication device comprises the steps of:

determining the identification number of the communication device; and transmitting a message directed to the communication device which includes the second set of encryption information.

4. A method as defined in claim 1, further comprising the steps of:

determining if the communication device has been compromised and if it determined that it has been compromised not providing the second set of programming information to the communication device.

5. A method as defined in claim 1, wherein the step of monitoring the at least one communication channel comprises the steps of:

determining if any messages have been sent by the communication device via the at least one communication channel; and attempting to decrypt any messages that are sent to the system controller using the first set of encryption information.

6. A method as defined in claim 5, wherein the step of establishing communications between the controller and the communication device comprises the step of:

transmitting an encrypted message directed to the communication device using the first set of encryption information.

7. A radio communication system including a plurality of communication devices, the plurality of communication devices using a first encryption key to communicate, the communication system comprising:

a communication channel resource; and a system controller coupled to the communication channel resource, the system controller comprising:

data base means for determining which of the plurality of communication devices have not received a second encryption key;

monitoring means coupled to the data base means for monitoring the communication channel resource in order to determine if any of the plurality of communication devices are communicating via the communication channel resource using the first encryption key; and transmission means coupled to the monitoring means for establishing communications with any of the plurality of communication devices which are communicating via the communication channel resource using the first encryption key in order to provide them with the second encryption key.

8. A radio communication system as defined in claim 3, wherein the system controller transmits an activation command to the communication devices which have received the second encryption key in order for the communication devices which have received the second encryption key to begin using the second encryption key.

* * * * *